Feb. 6, 1940.   R. H. WALLACE   2,189,719
AUTOMOBILE FRAME
Filed July 12, 1937   3 Sheets-Sheet 1
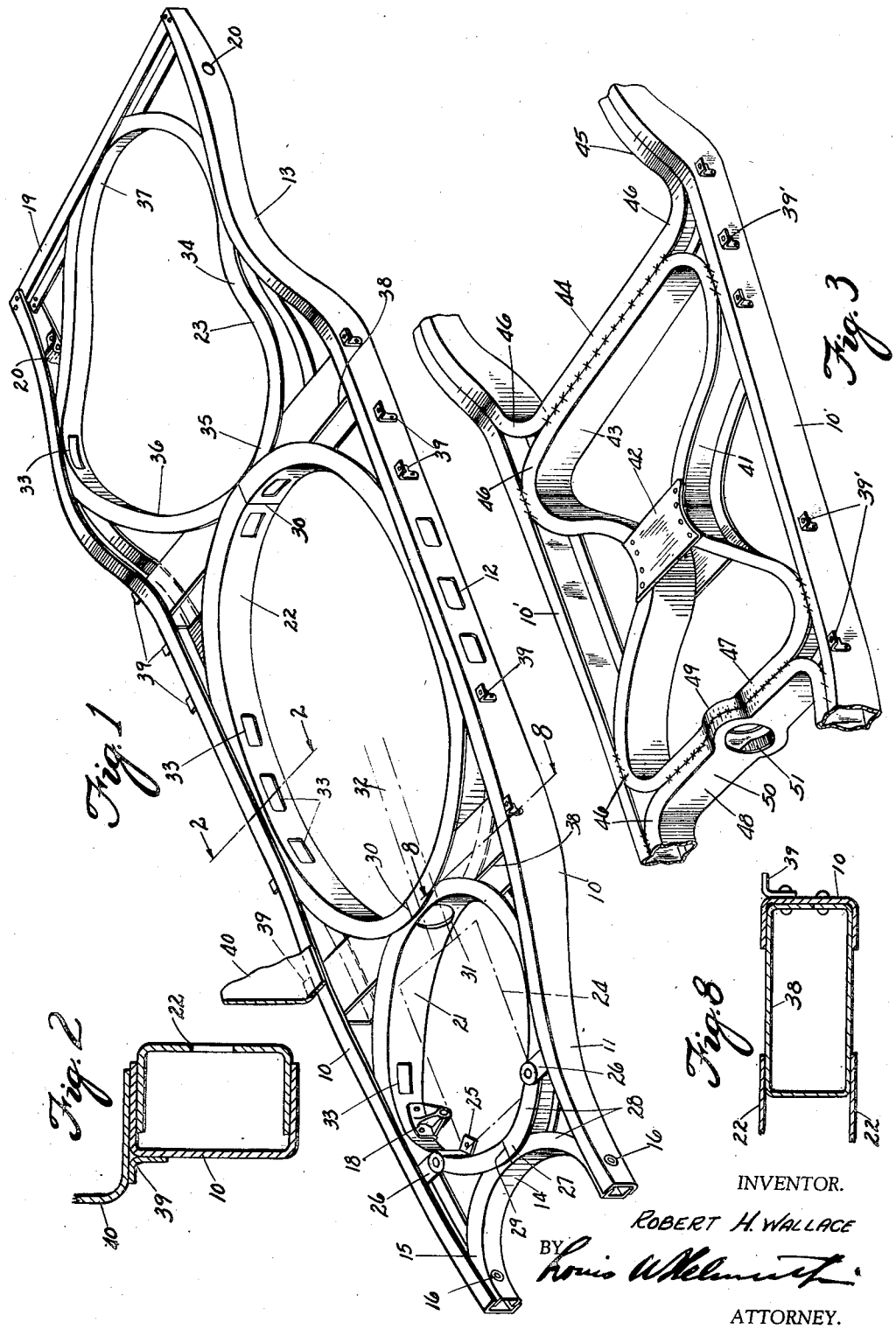
INVENTOR.
ROBERT H. WALLACE
BY
ATTORNEY.

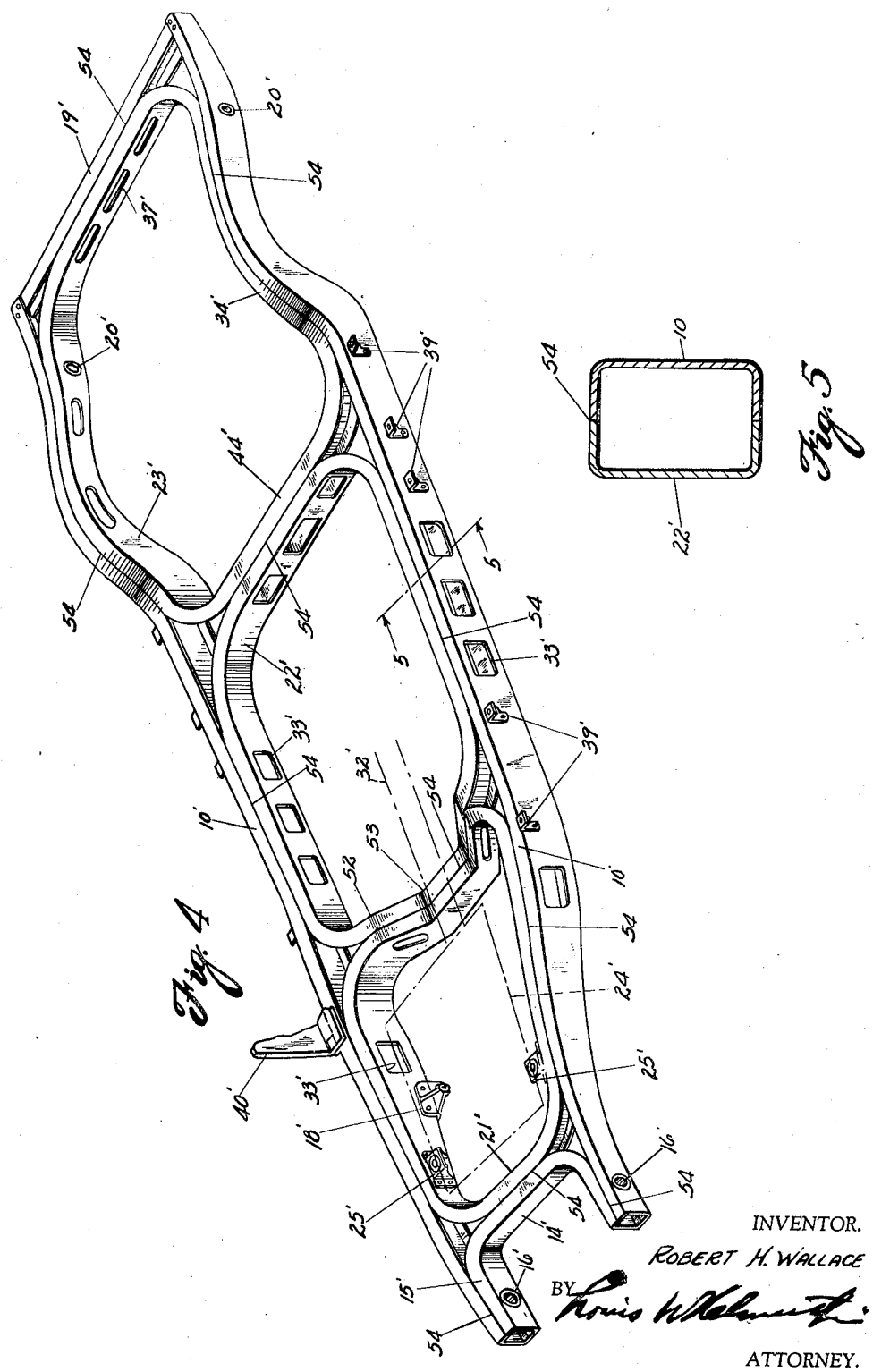

Feb. 6, 1940.  R. H. WALLACE  2,189,719
AUTOMOBILE FRAME
Filed July 12, 1937  3 Sheets-Sheet 3
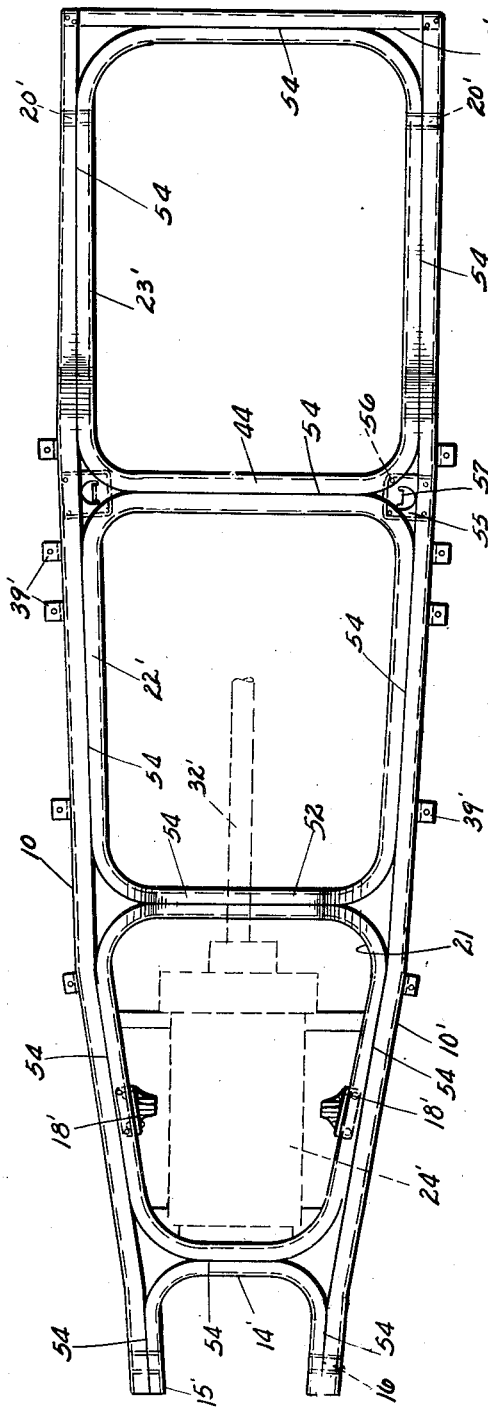
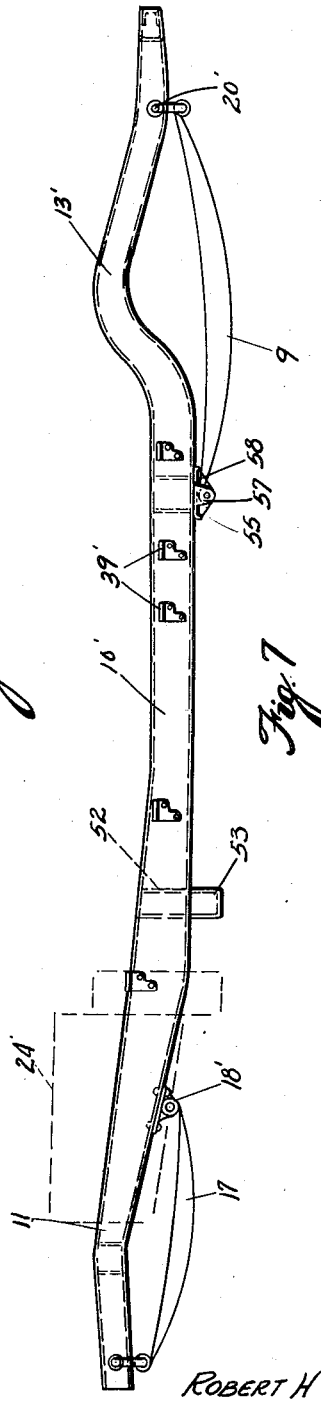
INVENTOR.
ROBERT H WALLACE
BY
ATTORNEY.

Patented Feb. 6, 1940

2,189,719

UNITED STATES PATENT OFFICE 2,189,719

AUTOMOBILE FRAME

Robert H. Wallace, Lakewood, Ohio, assignor to The Midland Steel Products Company, Cleveland, Ohio, a corporation of Ohio Application July 12, 1937, Serial No. 153,085

14 Claims. (Cl. 280—106)

This invention relates to new and useful improvements in automobile frames.

An important object of the invention is to provide an automobile frame composed of a pair of longitudinals or side rails in combination with a series of looped members which are inter-connected in somewhat chain like fashion longitudinally of the side rails to constitute load and stress transmitting members to evenly distribute the stresses and loads uniformly throughout the extent of the frame without causing concentration of stress and strain at any one or more individual points in the frame.

Another important object of the invention is to arrange the looped elements in a manner to form the frame with transverse hollow section members connecting the rails and to cooperate with the rails to form them into closed hollow section substantially from one end of the frame to the other.

A further object of the invention is to so proportion and locate the looped members that they transmit stress back and forth from one rail to the other throughout the length of the frame to dissipate the stresses and to provide means for the attachment of body, motor, springs and other adjuncts which transmit stresses to the looped members from points between the same and where they do not, by their own structure reinforce the side rails at these points.

Another object of the invention is to provide constructions of this nature which will simplify both the structure and manufacture of the frame.

Other objects and advantages of the invention will become apparent during the course of the following description.

In the accompanying drawings forming a part of the application and wherein like numerals are employed to designate like parts throughout the several views:

Fig. 1 is a perspective view of the improved frame.

Fig. 2 is a transverse section of the frame taken along the lines 2—2 of Fig. 1.

Fig. 3 is a fragmentary view of the central portion of the frame showing a modified form of central looped member and looped members disposed fore and aft of the central member, the forward end of the frame being toward the left of the figure.

Fig. 4 is a modified form of the invention.

Fig. 5 is a transverse section taken on the line 5—5 of Fig. 4.

Fig. 6 is a top plan of the frame of Fig. 4.

Fig. 7 is a side elevation of the same, and;

Fig. 8 is a transverse section taken on the line 8—8 of Fig. 1.

Due to the efficient construction of the frame, its longitudinal or side rails 10 as well as other parts may be constructed from very light gauge material. These side rails, as usual, are provided with forward offsets or kickups 11, and outwardly horizontally bowed central sections 12 which are deeper than the ends, and rear offset or kickup portions 13, usually of a greater degree than the forward kickups. These side rails, in the present instance, are illustrated as being light gauge inwardly facing channels having upper and lower inwardly extending flanges.

The forward ends of the side rails are connected by a half looped semi-circular front cross member 14 of channel cross section with its arched portion extending rearwardly and its sides or arms 15 extending forwardly substantially parallel and co-extensive with the forward ends of the side rails to be nested within the channels of the side rails and welded or riveted thereto to form the entire forward ends of the rails into hollow section. Tubular reinforcing members 16 extend through the box-section forward ends of the rails to constitute means of connection with the forward hangers of front springs 17. The rear ends of these springs are connected to rear hangers 18. Instead of nesting the arms of the front cross member within the channels of the side rails, they may be of substantially the same depth as the forward ends of the rails so that their flanges can be butt-welded to the flanges of the side rails to enlarge the hollow section at the forward end of the frame.

The rear ends of the two side rails are connected in spaced relation by an inwardly facing rear cross member 19 of channel shape having its ends nested within the channels of the rails for attachment thereto or butt-welded to form a rigid corner construction. Secured to the lower flange of each side rail adjacent its rear end, within the channel thereof, is secured a spring hanger 20 for the rear hanger of the rear springs 9 (see Fig. 7). These hanger brackets 20 may have tubular extensions extending through both webs of each of the two side rails as best seen at the extreme right hand end of Fig. 1.

The front and rear cross members 14 and 19 are tied into all other cross members of the frame and therefore, in effect are connected to one another. This unique arrangement is made possible by a series of inter-connected looped members extending throughout the entire length of the frame. This series of looped cross members comprise three in the present illustration, although it will be appreciated that more or less may be employed. These three looped members in the present instance are designated by the numerals 21, 22 and 23, all of which are constructed of outwardly facing light gauge channel section, each one being made of one or more pieces of channel stock into a continuous or endless loop as shown.

The forward looped cross member 21 is substantially ring or oval shaped to serve as a cradle for a motor 24 shown in dotted lines. This motor is mounted in any suitable or conventional way, within the ring and secured thereto by motor supporting brackets 25, the forward ones of which may have extensions to bridge the crotches or angles formed between the forward part 27 of the loop 21 and the side rails. This forward portion 27 is here shown in Fig. 1 as receiving the flanges of the intermediate portion of the front arcuate cross member 14 to form somewhat of an X-shaped member at the forward end of the frame. Because of the configuration of these looped members, the X-shaped cross member is provided with outwardly diverging pairs of arms 28. This forward loop 21 constituting the cradle of the motor, is here shown in Fig. 1, as an endless oval or ring formed from a single channel-shaped piece of stock with its ends formed around and united by welding or otherwise at 29. Due to the fact that the motor is supported in this looped member, all vibration and load of motor is transmitted around and around the loop in a circuit to the forward cross member and the intermediate looped member 22 and thence distributed along the side rails to the other cross members of the frame to absorb and dissipate the stresses.

The central looped member 22 of Fig. 1 is more of an oval shape and is here shown made from a pair of channel stampings united at the ends of the loop along the lines 30 by welding or otherwise. This loop 22 also has its channel and flanges opening outwardly to receive at its forward arched portion, the rear arched portion of the forward loop with the flanges thereof nested within the channel of the intermediate loop and secured thereto in any suitable manner to form, in effect, a sprawling transversely disposed X-shaped member. The webs of these connecting portions of the two loops are provided with aligned openings 31 for the passage of the drive shaft 32 from the transmission, or if desired for the mounting of a transmission housing. The web of the intermediate loop 22 as well as the webs of the other loops and those of the side rails of all modifications may be provided with a series of plain or flanged openings 33 to reduce as much as possible, the total weight of the frame and individual members, wherever the stock may be removed without sacrificing strength of the member or frame. This intermediate loop 22 is much larger than the forward looped member 21; and extends preferably longitudinally of the frame, from a point adjacent the transmission to a point adjacent the rear kickups 13. It is substantially co-planar with the side rails and its opposite sides are nested within the channels of the side rails and secured thereto by riveting or welding.

A third looped cross member 23 at the rear end of the frame also forms a continuous or endless loop with an outwardly facing channel and flanges. Opposite sides of this loop are offset upwardly at 34 to conform to the contour of the kickups 13 in the side rails and to dispose opposite sides of this loop within the channels of the kickup portions 13 to be secured thereto in any suitable manner. The forward portion of the rear loop 23 is nested within the rear portion of the intermediate loop 22 and is secured thereto in order to form a third transverse cross member of substantially X-shape with the portions 36 thereof constituting the rearwardly diverging arms of the third X-shaped member. The rear portion 37 of the looped member is somewhat narrower than its forward portion and is nested within the channel of the rear cross member 19 at its medial portion by rivets or welding. Due to this loop being narrower at its rear end, it constitutes forwardly diverging arms from the rear cross member 19 to the rear kickups 13 to thereby materially increase their rigidity since their section is ordinarily quite a bit reduced over the deeper mid-sections of the side rails.

In order to reinforce the entire structure and those portions of the side rails which are not reinforced by the looped constructions, box-shaped substantially rectangular brackets 38 are nested within the channels of the side rails opposite the crotches formed by the looped intermediate member 22, the rear end portion of the forward loop 21 and the forward end portion of the rear loop 23. The portions of the brackets 38 which contact the side rails and the looped members are affixed thereto wherever they contact and as stated previously are preferably nested within the channels of all of the elements to increase their rigidity and to form them into closed section so as to constitute additional straight transverse cross members of closed section. The forward hangers of the rear springs of the car may be secured to the rear box-like brackets 38 or to the rails or portions of the rear loop in proximity thereto. Body brackets 39 are attached to the side rails at points where they will immediately transmit these stresses from one looped member to the other as well as from one side rail to the other throughout the entire extent of the frame. A portion of the body of the vehicle is designated by the numeral 40 in Fig. 1 and 40' in Fig. 4.

In Fig. 3, it will be noted that the intermediate looped member 41 instead of being substantially oval, is, of itself of substantially X-shape. This is achieved by bending the opposite sides of the looped construction inwardly so that they extend toward one another and toward the longitudinal center of the frame to be suitably connected with gussets 42 forming a tunnel through which may project, the propeller shaft of the vehicle. The rear transverse end 43 of the loop 41 is also formed substantially straight as shown in Fig. 3 to be contiguous with the straight forward transverse end 44 of the rear loop 45. This permits the welding of the two loops together over a greater area and the flanges of one loop may be butt-welded to those of the adjacent loop to form a substantially hollow transverse cross member having its ends 46 diverging outwardly to meet and be secured to the side rail at points spaced lengthwise thereof. The forward end portions 47 of the intermediate loop 41 is arranged similarly, and similarly connected to the rear end portions of the forward loop 48 to form a second elongated transverse cross member 50 of hollow cross section. The intermediate portion of the straight transverse cross member 50 formed by the cooperation of the forward and rear end portions of adjacent loops is increased in depth as at 49 and provided with openings 51 to accommodate the mounting of a transmission housing or the projection of the drive shaft from the motor therethrough. In this modification, it will be apparent that all three of the main loops are of substantially rectangular configuration, especially the front and rear looped members 48 and 45. The central looped member 41 where it touches the two side rails at substantially its four corners, are shown as being butt-welded to the flanges of the two rails. The small x'd lines in Fig. 3 indicate butt welding.

Figs. 4 to 7 inclusive show another modified form of the invention and parts thereof which correspond to parts of the preceding modifications are designated with the same numerals with a prime coefficient added. The form of the looped members 21', 22' and 23' is somewhat similar to that shown in Fig. 3 wherein the flanges of these looped members are butt-welded to one another and to the side rails and to the front and rear cross members along the lines designated by the numeral 54. In this modification shown in Figs. 4 to 7, it will be noted that the welding of the three looped members to one another as well as to the front and rear cross members 14' and 19', provides the frame with four hollow transverse cross members each terminating in arms arranged diagonally or oblique with respect to the side rails which they meet and to which they are secured. The union of the looped members 21' and 22' creates a second transverse cross member 52 of hollow section. This cross member has its central portion 53 depressed below the general plane of the frame to provide clearance for the transmission housing and drive shaft, and may constitute a means for supporting the transmission and incidentally the motor 24'.

Forward hangers for the front ends of rear springs 9 are formed by channel-shaped stampings 55 arranged horizontally to be secured to the lower flanges of the side rails, and extended to be connected to the outwardly diverging arms of the central and rear loops 22' and 23' as designated by the numeral 56. Each of these hangers is provided with a pressed out tongue 57 apertured and cooperating with a depending free end 58 of the stamping to constitute a support for the front end of each rear spring.

It will be understood that various changes in the size, shape and relation of parts may be resorted to without departing from the spirit of the invention or the scope of the appended claims.

I claim:

1. An automobile frame comprising a pair of longitudinal side rails, and a plurality of independent endless looped members rigidly connecting the rails and rigidly connecting one another to relieve the rails from concentrated strains and to uniformly distribute stress throughout all parts of the frame, one of said looped members being arranged substantially in the central portion of the frame.

2. An automobile frame comprising a pair of longitudinal side rails, and a plurality of independent endless curved looped members rigidly connecting the rails and rigidly connecting one another, the rigid connecting portions of the looped members forming X-shape members with the arms of each diverging outwardly toward the rails to which said arms are connected, said side rails being arranged tangentially to said looped members, and one end of said looped members being arranged substantially in the central portion of the frame.

3. An automobile frame comprising a pair of longitudinal side rails, and a plurality of endless looped members rigidly connecting the rails and rigidly connecting one another, one of said looped members encircling the motor and another being arranged substantially at the central portion of the frame.

4. An automobile frame comprising a pair of longitudinal side rails, a plurality of endless looped members rigidly connecting the rails and rigidly connecting one another, one of said looped members encircling the motor, another being arranged substantially at the central portion of the frame, and a third looped member being arranged rearwardly of the middle looped member and extending to the rear end of the frame.

5. An automobile frame comprising a pair of longitudinal side rails, a plurality of endless curved looped members rigidly connecting the rails and connecting one another, one of said looped members encircling the motor, another being arranged substantially at the central portion of the frame, a third looped member being arranged rearwardly of the middle looped member and extending to the rear end of the frame, and a body structure secured to the rails at points of connection of the looped members and the rails to relieve the rails from stress at points where the looped members are not contiguous with the rails.

6. An automobile frame comprising a pair of longitudinal side rails of inwardly facing channel section and a plurality of endless looped members rigidly connecting the rails and rigidly connecting one another, said looped members being constructed from outwardly facing channels forming box-sections where they connect with each other and where they connect with the side rails.

7. An automobile frame comprising a pair of longitudinal side rails, and a plurality of endless looped members connecting the rails and connecting one another, said looped members forming hollow sections where they connect with each other and where they connect with the side rails, the sides of the looped members being substantially straight for considerable lengths to form transverse cross members of hollow section and to extend parallel along the side rails to form the major portions of the side rails into hollow section.

8. An automobile frame comprising a pair of longitudinal side rails, a plurality of endless looped members connecting the rails and connecting one another, said looped members being constructed from outwardly facing channels forming box-sections where they connect with each other and where they connect with the side rails, the sides of the looped members being substantially straight for considerable lengths to form transverse cross members of box-section and to extend parallel along the side rails to form the major portions of the side rails into hollow-section, and certain of said transverse members being offset out of the plane of the rails for clearance of adjuncts of the automobile.

9. An automobile frame comprising a pair of longitudinal side rails, a plurality of endless looped members connecting the rails and connecting one another, one of said looped members encircling the motor and another being arranged substantially at the central portion of the frame, a third looped member being arranged rearwardly of the middle looped member and extending to the rear end of the frame, and forward hangers of rear springs secured to the side rails and to the second and third looped members.

10. An automobile frame comprising a pair of longitudinal side rails, a plurality of endless looped members connecting the rails and rigidly connecting one another, one of said looped members encircling the motor, another being arranged substantially at the central portion of the frame, and a half looped member having forwardly extending outwardly facing channel arms paralleling the forward ends of the side rails out to the ends thereof and forming a hollow section therewith, and the medial portion of the half looped member being rigidly secured to the motor looped member.

11. An automobile frame comprising a pair of side rails rigidly connected together by transverse members at the forward and rear ends, a plurality of endless looped members rigidly connected to the side rails between their end portions and rigidly connected to each other, and the end portions of the looped members being rigidly connected with the transverse members and forming portions of such transverse members into hollow cross section.

12. An automobile frame comprising a pair of side rails rigidly connected together by transverse members at the forward and rear ends, a plurality of endless looped members rigidly connected to the rails between their end portions and rigidly connected to each other, and the end portions of the looped members being rigidly connected with the transverse members and forming portions of such transverse members into hollow cross section with ends diverging outwardly in spaced relation to meet the side rails at spaced points.

13. An automobile frame comprising a pair of side rails, a plurality of endless looped members arranged end to end and with their opposite sides rigidly secured to the side rails, and the contiguous end portions of said looped members being straight and rigidly united to form a hollow transverse cross member.

14. A vehicle frame comprising a pair of longitudinal side rails, a plurality of substantially looped members having sides and ends, and said members being arranged between said side rails in tandem throughout substantially the entire length of the frame with their ends arranged adjacent one another and their sides arranged with respect to the side rails to form them into hollow section throughout substantially their entire lengths.

ROBERT H. WALLACE.